United States Patent [19]

Nishiike et al.

[11] Patent Number: 4,555,228

[45] Date of Patent: Nov. 26, 1985

[54] APPARATUS FOR AUTOMATICALLY EXCHANGING DIE FOR INJECTION MOLDING

[75] Inventors: Naritoshi Nishiike; Takashi Nishimaki, both of Chiba; Yasushi Miura, Yokohama; Masaaki Kumamura, Ohita, all of Japan

[73] Assignee: Sumitomo Heavy Industries, Ltd., Tokyo, Japan

[21] Appl. No.: 588,871

[22] PCT Filed: Jun. 22, 1983

[86] PCT No.: PCT/JP83/00200

§ 371 Date: Feb. 22, 1984

§ 102(e) Date: Feb. 22, 1984

[87] PCT Pub. No.: WO84/00128

PCT Pub. Date: Jan. 19, 1984

[30] Foreign Application Priority Data

Jun. 22, 1982 [JP] Japan ................. 57-106107

[51] Int. Cl.[4] .............................. B29F 1/00
[52] U.S. Cl. ..................... 425/185; 425/186; 425/190; 425/192 R; 425/575
[58] Field of Search ................. 425/182–185, 425/186, 190, 575, 192, 411, 451.9, 542; 100/918; 264/328.7

[56] References Cited

U.S. PATENT DOCUMENTS

4,005,964  2/1977  Bishop .................. 425/190
4,152,978  5/1979  Abe et al. .............. 100/918
4,174,939  11/1979  Fenner ................. 425/451.9
4,348,165  9/1982  Vostrovsky ............. 425/190

FOREIGN PATENT DOCUMENTS

3228434  3/1983  Fed. Rep. of Germany ...... 425/190
419579  3/1967  Switzerland .............. 100/918

*Primary Examiner*—Peter Kratz
*Assistant Examiner*—J. Fortenberry
*Attorney, Agent, or Firm*—Armstrong, Nikaido, Marmelstein & Kubovcik

[57] ABSTRACT

An automatic die exchanging device for injection molding machine, capable of automatically exchanging split dies on the machine. A mold exchanging base having at least two transfer passages is disposed at a lateral side of the molding machine. A split die composed of two die half parts locked to each other is placed on one of the transfer passages, and the base is moved to bring the vacant transfer passage to a lateral side of the die mounting portion of the molding machine. The die half parts of the die on the injection molding machine are unclamped from the platens and are locked to each other. This die is then transferred by a transfer means from the molding machine to the vacant transfer passage. Then, the base is moved to bring the transfer passage carrying the new die to the lateral side of the die mounting portion to transfer the new die to the molding machine. The die half parts of this new die are clamped to the platens and are unlocked from each other. It is thus possible to perform all of the operations for the die exchange automatically. Since the replacement of the dies on the die exchanging base can be made during the molding operation, the time required for the die exchange is shortened to improve the rate of operation.

5 Claims, 9 Drawing Figures

APPARATUS FOR AUTOMATICALLY EXCHANGING DIE FOR INJECTION MOLDING

FIELD OF ART

The present invention relates to an apparatus for automatically exchanging die for injection molding and, more particularly, to an automatic die exchanging apparatus for injection molding capable of automatically performing quick attaching and detaching of the die to and from an injection molding machine.

BACKGROUND ART

The current diversification of molded articles has caused a tendency of large-lot small-quantity production by a single injection molding machine, which in turn gives rise to the demand for frequent exchange of dies. Consequently, the length of the time called preparation time, required for the die exchange, is increased in relation to the molding time to cause various problems such as reduced rate of operation of the molding machine, increased number of workers, and so forth.

It is, therefore, important in the development of the molding machine to minimize the die exchanging time and to automate the die exchanging operation as much as possible. Although some measures have been developed to this end, these measures are to automate only a part of the die exchanging process.

DISCLOSURE OF THE INVENTION

Under this circumstance, the present invention aims at providing a full automatic apparatus which can perform quickly the die exchanging process including feeding of the die to the injection molding machine, centering of the die, and clamping of the die, without requiring by human labour.

To this end, according to the invention, there is provided an automatic die exchanging apparatus for automatically exchanging split die on an injection molding machine, the split die having a locking mechanism adapted to automatically lock the preset die half parts, the injection molding machine having a die mounting portion between a stationary platen and a movable platen and accessible by the locked split die from a lateral side of the injection molding machine, the automatic die exchanging apparatus comprising: a die exchanging base having at least two transfer passages adapted to carry a locked die, the die exchanging base being movable to alternatingly bring the transfer passages into alignment with the die mounting portion at one side of the molding machine; a transfer means for transferring the locked die from the aligned transfer passage to the die mounting portion and vice versa; a locating means for locating the die transferred to the die mounting portion at a predetermined position; a clamping means for fixing the die half parts of the located die to the stationary platen and the movable platen of the molding machine; and means for maintaining the locking mechanism of the dies in unlocking state during the operation of the molding machine.

THE BEST MODE FOR CARRYING OUT THE INVENTION

Figure 1:
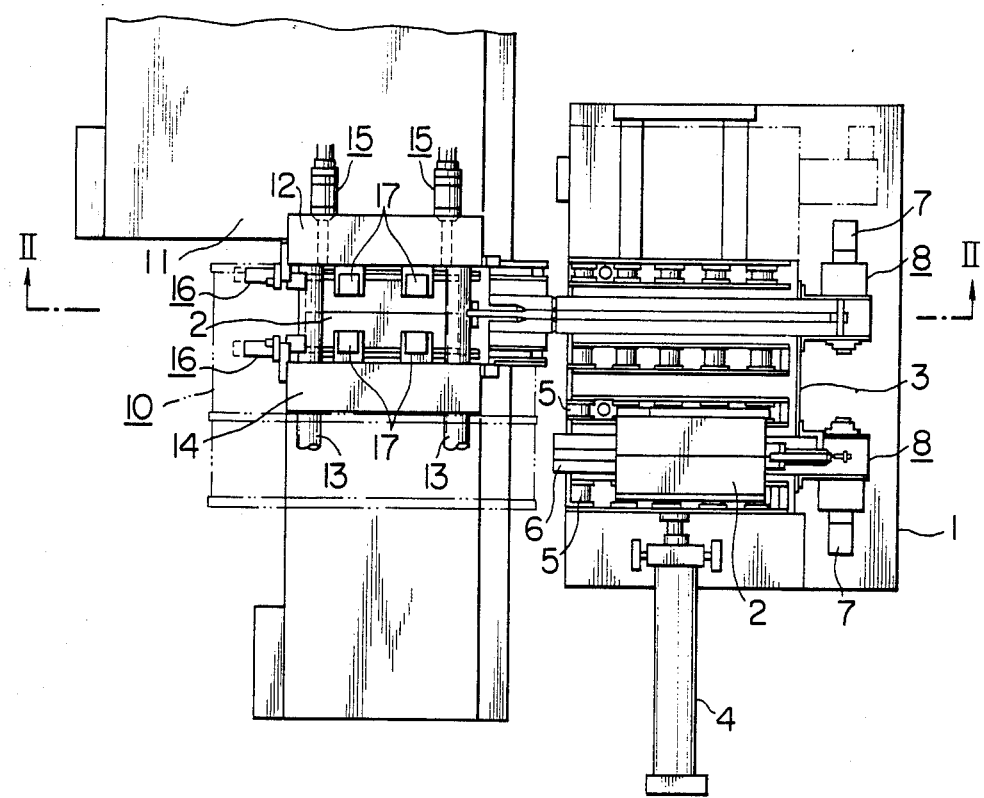
FIG. 1 is a schematic plan view of an embodiment of the apparatus in accordance with the invention.
Figure 2:
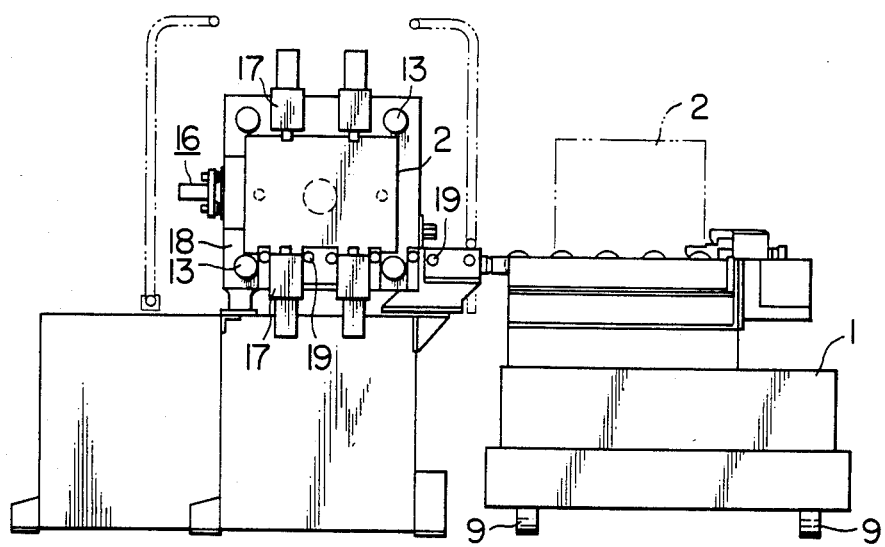
FIG. 2 is a schematic front elevational view as viewed in the direction of line II—II of FIG. 1.
Figure 3:
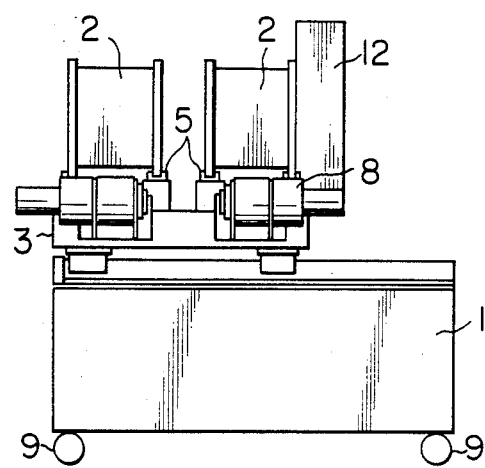
FIG. 3 is a schematic side elevational view of the embodiment shown in FIG. 1.

FIGS. 1, 2 and 3 schematically show an example of an injection molding machine incorporating an automatic die exchanging apparatus in accordance with the invention. A die exchanging truck 1 is disposed at one side of the injection molding machine 10. On the die exchanging truck 1 mounted is an exchanger base 3 which is slidable on the truck by means of a cylinder 4. The exchanger base 3 carries at least two transfer passages composed of series of guide rollers 5,5 arrayed in the direction perpendicular to the direction of sliding of the exchanger base 3. Each transfer passage can carry one injection molding die 2 which is preset by a locking mechanism mentioned later. Each transfer passage has two rows of rollers 5 arranged along both longitudinal sides thereof. A snake chain guide 6 for guiding a snake chain (not shown) is disposed between two rows of the rollers 5. A die transfer means 8 composed of the snake chain, snake chain guide and a driving motor 7 is associated with each transfer passage. The snake chain is driven by sprockets attached to the drive shaft of the driving motor 7 to run towards and away from the injection molding machine in accordance with the direction of rotation of the driving motor 7, while being guided by a snake chain guide 6. The exchanging truck 1 has wheels 9,9 and is movable by, for example, a self-propelling means.

The injection molding machine 10 is constituted by a stationary platen 12 mounted on a base frame 11, die rods 13,13 extending between the stationary platen 12 and a toggle support (not shown), a movable platen 14 slidably held by the tie rods 13,13, die clamping means 17,17 mounted on the stationary platen 12 and the movable platen 14, respectively, and other means not shown such as die closing means, injection means and control means, A reference numeral 18 designates a stopper, and 19,19 denote guide rollers mounted in the injection molding machine 10.

Figure 4:
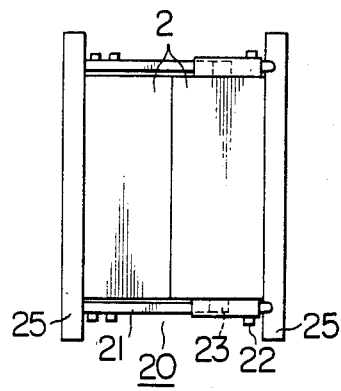
FIG. 4 is a plan view of an example of a split die with a locking mechanism as used in the apparatus of the invention.
Figure 5:
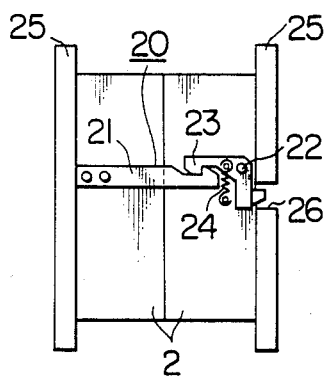
FIG. 5 is a side elevational view of the split die.

FIGS. 4 and 5 show a split die 2 for use in the apparatus of the invention. The die locking mechanism 20 mentioned before has a retaining claw 21 on one of the die half part of the split die, and a rotary claw 23 which is pivotally secured through a pin 22 to the other die half part. The claw 23 is normally urged towards the retaining claw 21 by a spring 24 which is fixed at its one end to the claw 23 and at its other end to the die 2, so that the claws 21 and 23 engage with each other to perform the self-locking of the die 2.

A reference numeral 25 designates a die holder. The die holder 25 has a bore 26 which serves as a locating hole and also as a hole for receiving a die unlocking rod.

Figure 6:
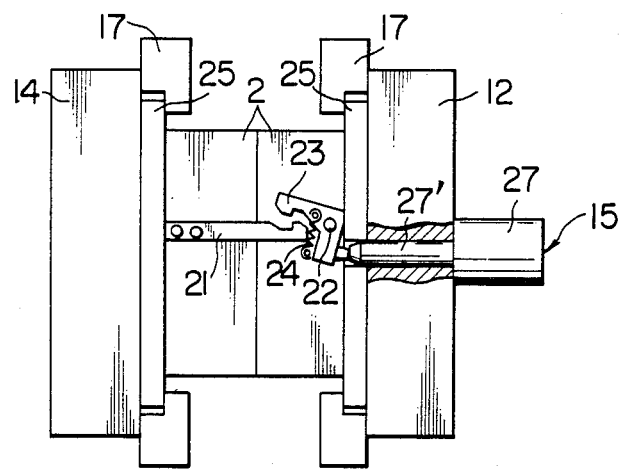
FIG. 6 is a side elevational view of the split die attached to a molding machine, with its locking mechanism in the unlocking state.

As shown in FIG. 6, the die locating and unlocking means 15 has a cylinder 27 mounted on the stationary platen 12, and a rod 27'. The end of the rod 27' has a frusto-conical shape so as to be able to correct a slight offset of the tie (rod receiving hole).

Figure 8:
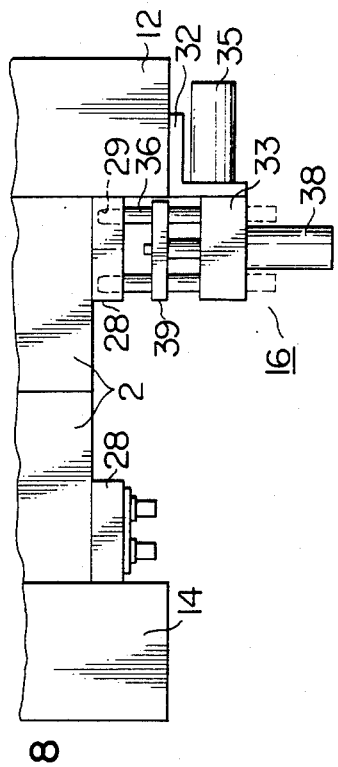
FIG. 8 is a partial plan view of the automatic connecting means shown in FIG. 7 for connecting pipe and wiring to the split die, wherein the right half part of the Figure shows the movable part with the connecting terminals omitted therefrom.
Figure 7:
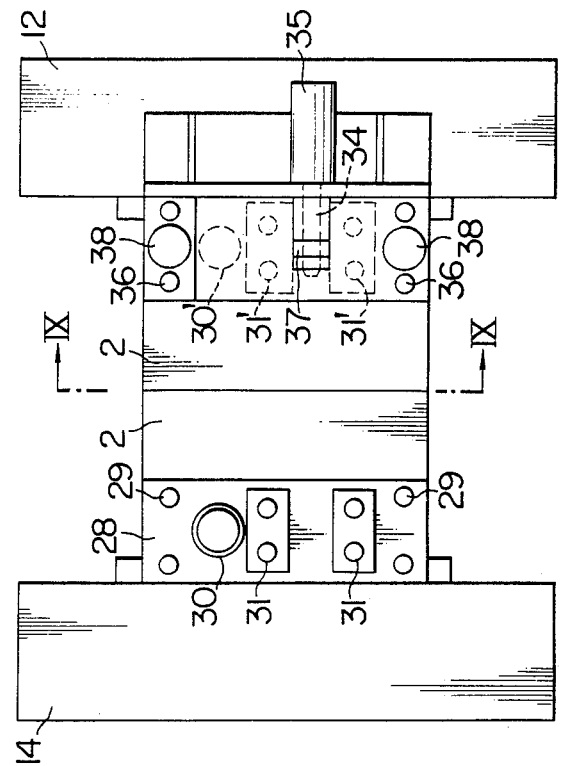
FIG. 7 is a side elevational view of an automatic means for automatically connecting pipe and wirings to the split die mounted on the molding machine, wherein the left half part of the Figure shows connection terminals attached to the die except the movable part of the connecting means.
Figure 9:
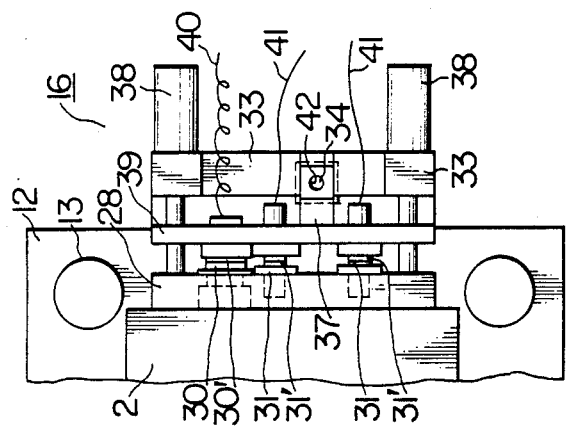
FIG. 9 is a partial front elevational view of the automatic pipe and wiring connecting means as viewed in the direction of the line IX—IX of FIG. 7.

FIGS. 7 to 9 in combination show an automatic pipe and wiring connecting means 16. The means 16 is composed of a stationary side provided with first connecting terminals of the pipe and wiring, and a movable side provided with the second connection terminals for co-operation with the first terminals. More specifically, the stationary side is constituted by connecting plates 28 secured to respective die half part 2, each plate 28 being provided with the first terminals, i.e. electric power feeding receptacle 30 and an oil or water feeding coupler 31 and having guide pin holes 29. On the other hand, the movable side includes movable connecting plates 39 mounted for movement relative to the stationary platen 12 and the movable platen 14, respectively, and each provided with the second terminals, i.e. electric power feeding plug 30' and oil or water feeding coupler 31'. More specifically, each of the stationary platen 12 and the movable platen 14 has an L-shaped bracket 32 to which secured are a fixing bracket 33 and a locking cylinder 35 for driving a locking pin 34 back and forth. Guide pins 36,36 aligning with the guide pin holes 29 in the stationary side connecting plate 28 are slidably held by the fixing bracket 33. The movable connecting plate 39 is fixed to these guide pins 36,36. The movable connecting plates 39 are adapted to be driven towards and away from the stationary side connecting plates 28 by means of connecting cylinders 38,38 which are mounted on the fixing bracket 33. The movable connecting plate 39 carries also a locking plate 37 having a locking pin hole 42. The arrangement is such that, when the receptacles and plugs 30,30' and couplers 31,31' of both connecting plates are brought to the position for the connection, the locking cylinders 35 operate to drive the locking pins 34 into the locking pin holes 42 thereby to lock the movable connecting plates 39. A reference numeral 40 designates a cable through which the electric power feeding plug 30' is connected to the body of the molding machine, while numerals 41,41 denote pipe through which the oil or water feeding couplers 31' are connected to the body of the molding machine.

Although the embodiment described hereinbefore employs the self-propelling die exchanging truck 1, the use of this truck is not essential. For instance, the truck 1 is eliminated and the preset injection molding die 2 is placed on a stationary exchanging base 3 by means of an overhead travelling crane (not shown). In another alternative arrangement, the exchanging base 3 is mounted on the exchanging truck 1 not slidably but immmovably and the movement of the exchanging truck 1 itself is controlled by means of, for example, limit switches to bring the truck 1 to a position where the new and old dies are transferable to and from the molding machine. In a further example, the combination of the chain and the driving motor constituting the transfer means 8 is substituted by a combination of a piston and a cylinder. It is also possible to substitute the die locating and unlocking means by a construction having a locating means and a locking means which are independent from each other. Other changes are of course possible without departing from the scope of the invention.

The invention has the construction explained hereinbefore. In operation, the injection molding die 2, which has been subjected to a pre-adjustment such as pre-heating by a die pre-heater not shown, is locked by the die locking means 20 and is moved by the die exchanging truck 1 (or known overhead travelling crane or the like) to the die mounting position at one side of the injection molding machine 10 (position between the stationary platen 12 and the movable platen 14). Then, a position adjustment is conducted to bring the guide rollers 5,5 of one of the transfer passages on the exchanging base 3 into linear alignment with the guide rollers 19,19 on the injection molding machine 10. Subsequently, the transfer means 8 is driven to transfer the die 2 on the exchanging base 3 into the molding machine 10. This position for the transfer is limited by the stopper 18.

Subsequently, the die locating and die unlocking means 15 operates to drive the rod 27' of the cylinder 27 into the rod receiving hole 26 in the die holder 25, thereby to locate the die 2 with respect to the stationary platen 12. Then, as the rod 27' is further extended, it comes into contact with the rotary claw 23 of the die locking means 20 to rotate the same 23 in the direction for disengagement from the retaining claw 21, thereby to unlock the die 2.

After the unlocking of the two half parts of the die 2 from each other, the die clamping means 17,17 are operated to fix the die 2 to the stationary platen 12 and the movable platen 14. Subsequently, the connecting cylinders 38,38 of the automatic pipe and wiring connecting means 16 are operated to drive the movable connecting plates 39 towards the die 2 thereby to connect the electric power feeding plugs 30' and the oil or water feeding couplers 31' on the plates 39 to the electric power feeding receptacles 30 and oil or water feeding couplers 31 on the connecting plates. Subsequently, the mold closing force is suitably set to complete the attaching of the die.

Then, a prescribed injection molding is performed and, after the completion of the molding, a procedure reverse to that described before is taken while keeping the die in the closed state. Namely, the connecting cylinders 38,38 of the automatic pipe and wire connecting means 16 are reversed to disconnect the electric power feeding receptacles 30 and plugs 31 from each other and also the oil or water feeding couplers 31 and 31' from each other. Then, the die locating, and unlocking means 15 is operated to retract the rod 27' of the cylinder 26 thereof, so that the die 2 is automatically locked again by the die locking means 20. The rod 27' is further retracted into the stationary platen 12.

Then, the die clamping means 17,17 are operated for unclamping to separate the die 2 from the stationary platen 12 and the movable platen 14. In order to facilitate the transfer of the die, the movable platen 14 is retracted by a desired amount (2 to 5 mm). Then, the transfer means 8 is operated to transfer the used (old) die from the injection molding machine 10 to the transfer passage on the exchanging base 3 adjacent to the transfer passage carrying the (new) mold prepared beforehand for the next molding operation.

A series of operation including the steps of transfer of the die into the molding machine, attaching of the die to the molding machine, detaching of the die from the molding machine and transfer of the die out of the molding machine is thus completed. This series of operation is repeated cyclically. Namely, after the transfer of the old die out of the molding machine, the die exchanging base 3 on the die exchanging truck 1 is moved by the hydraulic cylinder 4 to make the transfer passage carrying the new die confront the die exchanging position of the molding machine 10 thereby to bring the guide rollers 5,5 of the exchanging base 3 into alignment with the guide rollers 19,19 on the injection molding machine 10. Then, the same die attaching and detaching operation as that described before is conducted to attach the new die to the molding machine and to detach the same after the completion of the injection molding operation. Then, this die is replaced with the next die.

Needless to say, all of the steps of the die exchanging process explained hereinbefore are made automatically under the control of a controller which is not shown.

INDUSTRIAL APPLICABILITY

As will be understood from the foregoing description, according to the invention, it is possible to quickly and automatically perform, without requiring any human labour, a series of operation including the steps of transfer of the die into the molding machine, centering, attaching, detaching of the die after the completion of the injection molding, and transfer of the die out of the injection molding machine.

Consequently, it is possible to attain a high rate of operation of the injection molding machine and to save the labour even in a large-lot small-quantity production which requires a frequent exchange of the die.

We claim:

1. An automatic die exchanging apparatus for automatically exchanging a split die on an injection molding machine having a stationary platen and a movable platen arranged to move horizontally with respect to said stationary platen, said split die having a locking mechanism adapted to automatically lock the preset die half parts, said injection molding machine having a die mounting portion between said stationary platen and said movable platen and accessible by the locked split die from a lateral side of said injection molding machine, said automatic die exchanging apparatus comprising: a die exchanging base having at least two transfer passages adapted to carry a locked die, said die exchanging base being movable to alternatingly bring said transfer passages into alignment with said die mounting portion at said lateral side of said molding machine; a transfer means for transferring said locked die from the aligned transfer passage to said die mounting portion and vice versa; a locating means for locating said die transferred to said die mounting portion at a predetermined postion; a clamping means for fixing the die half parts of the located die to said stationary platen and said movable platen of said molding machine; and means provided on one of said stationary and movable platens for releasing said locking mechanism to unlock said die half parts, said means being effective only when said die half parts are located to be fixed to respective platens.

2. An automatic die exchanging apparatus according to claim 1, wherein said locking mechanism includes a retaining claw fixed to one of said die half parts, a rotary claw pivotally secured to the other die half part and adapted to engage with said retaining claw when both die half parts are preset, and a spring which urges said rotary claw in the direction for engagement with said retaining claw.

3. An automatic die exchanging apparatus according to claim 2, wherein the platen mounting the die half part pivotally carrying said rotary claw has a rod movable towards and away from said rotary claw, said rod when projected engages with said rotary claw to rotate said rotary claw in the direction for disengagement from said retaining claw against the force of said spring.

4. An automatic die exchanging apparatus according to claim 3, wherein each die half part is adapted to be clamped to each platen through a hold, the holder associated with the die half part pivotally carrying said rotary claw has a rod receiving hold adapted to be aligned with said rod when the same die half part is located at a predetermined position with respect to said platen, so that said rod when projected is received by said rod receiving hole so as to make engagement with said rotary claw.

5. An automatic die exchanging apparatus according to any one of claims 1 to 4, wherein each die half part is provided with first connection terminals for pipes and wirings, while each of said stationary platen and said movable platen has a movable connecting plate carrying second connecting terminals for pipes and wirings, said second connection terminals on said movable connecting plates being adapted to be aligned with corresponding first connection terminals on said die half parts when said die parts are clamped at predetermined positions with respect to said platens, whereby said second connection terminals are connected to corresponding first terminals as said movable connecting plates are moved towards respective die half parts.

* * * * *